United States Patent
Basavanhally

(10) Patent No.: US 9,308,596 B2
(45) Date of Patent: Apr. 12, 2016

(54) METHOD AND ASSEMBLY INCLUDING A CONNECTION BETWEEN METAL LAYERS AND A FUSIBLE MATERIAL

(71) Applicant: ALCATEL-LUCENT USA INC., Murray Hill, NJ (US)

(72) Inventor: Nagesh Basavanhally, Skillman, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 100 days.

(21) Appl. No.: 14/157,887

(22) Filed: Jan. 17, 2014

(65) Prior Publication Data

US 2015/0205046 A1    Jul. 23, 2015

(51) Int. Cl.
- *G02B 6/12* (2006.01)
- *B23K 1/20* (2006.01)
- *B32B 3/26* (2006.01)
- *B23K 1/00* (2006.01)
- *B23K 3/06* (2006.01)
- *G02B 6/42* (2006.01)

(52) U.S. Cl.
CPC ............... *B23K 1/20* (2013.01); *B23K 1/0016* (2013.01); *B23K 3/0623* (2013.01); *B32B 3/266* (2013.01); *G02B 6/4214* (2013.01); *G02B 6/4238* (2013.01); *B23K 2201/42* (2013.01); *Y10T 428/24331* (2015.01)

(58) Field of Classification Search
CPC .... G02B 6/132; G02B 6/4257; G02B 6/4219; G02B 6/4239; B23K 31/02; B23K 1/19; B23K 26/3206; B23K 35/24; B23K 9/23; H05K 3/303; Y10T 29/49165
USPC ...................... 385/14; 228/165, 135; 428/138
See application file for complete search history.

(56) References Cited

U.S. PATENT DOCUMENTS

| | | | | |
|---|---|---|---|---|
| 6,739,761 | B2 * | 5/2004 | Tsukamoto et al. | 385/89 |
| 7,449,784 | B2 * | 11/2008 | Sherrer et al. | 257/774 |
| 8,618,421 | B2 * | 12/2013 | Byun et al. | 174/260 |
| 8,836,327 | B2 * | 9/2014 | French et al. | 324/244.1 |
| 9,029,259 | B2 * | 5/2015 | Stupar et al. | 438/667 |
| 2008/0279518 | A1 * | 11/2008 | Yonekura et al. | 385/127 |
| 2010/0288525 | A1 * | 11/2010 | Basavanhally et al. | 174/50.52 |
| 2011/0116736 | A1 * | 5/2011 | Kim et al. | 385/14 |
| 2012/0170887 | A1 * | 7/2012 | Yang et al. | 385/14 |

* cited by examiner

*Primary Examiner* — Ellen Kim

(74) *Attorney, Agent, or Firm* — Carlson, Gaskey & Olds, P.C.

(57) ABSTRACT

An illustrative assembly includes a first component having a hole between two first component surfaces. The hole includes a first metal layer on the first component inside the hole. A second component includes a second component surfaced adjacent one of the first component surfaces. The second component includes a second metal layer on the second component. A fusible material is at least partially in the hole and at least partially in the recess. The metal alloy establishes a connection between the first and second metal layers.

24 Claims, 3 Drawing Sheets

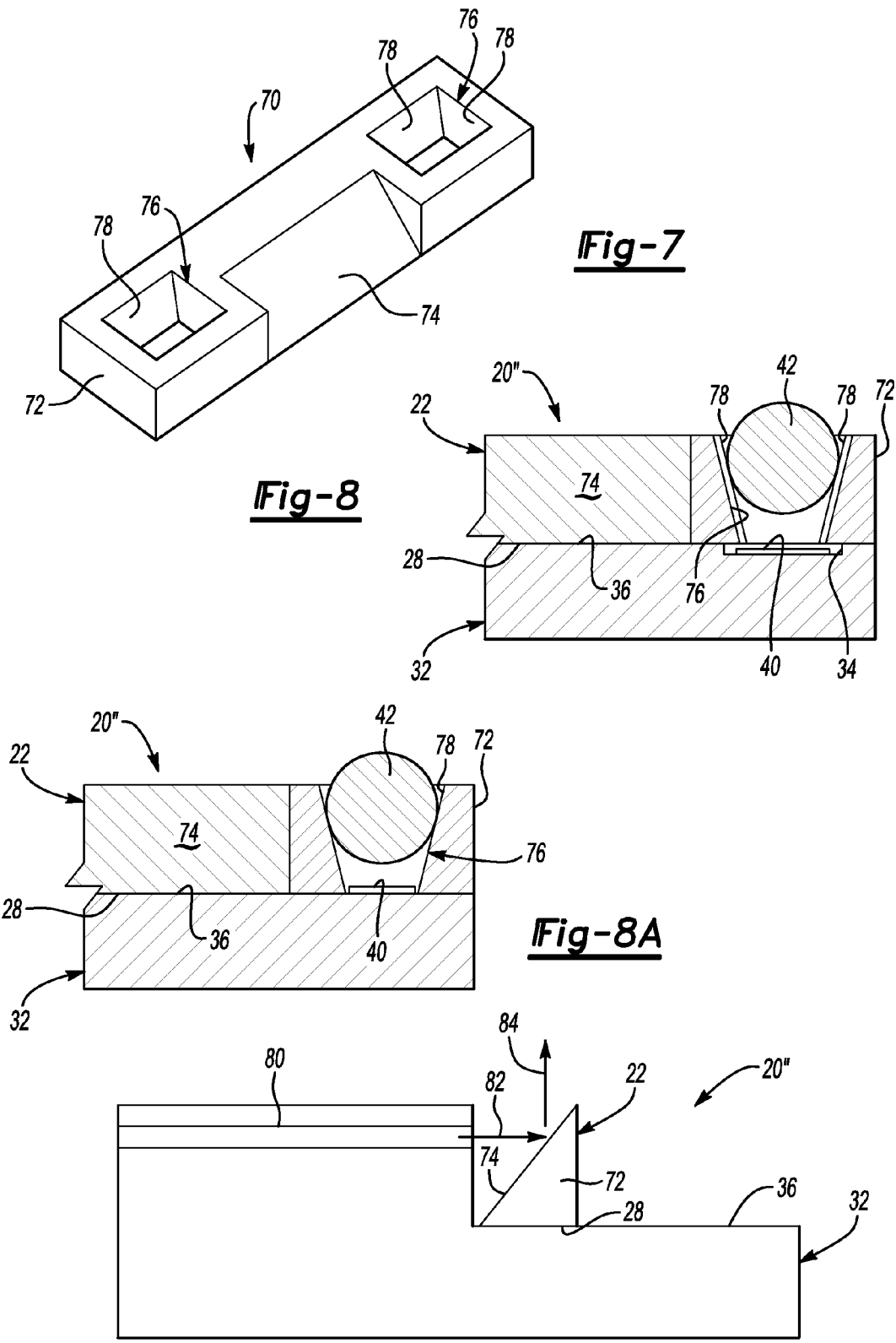

METHOD AND ASSEMBLY INCLUDING A CONNECTION BETWEEN METAL LAYERS AND A FUSIBLE MATERIAL

BACKGROUND

There are a variety of situations in which devices, such as electronic devices, include multiple layers. Various techniques are used for securing such layers together. For example, a silicon wafer and a borosilicate or glass wafer may be secured together using an anodic bond. In some situations, the configuration of components supported on such layers makes it challenging to establish appropriate connections (e.g., electrical, mechanical or both) with those components once the layers have been secured together. Additionally, some electronic devices are so small in size that special techniques may be required to secure different layers or components together. One drawback associated with known techniques is they tend to make the assembly more expensive.

SUMMARY

An illustrative assembly includes a first component having a hole between two first component surfaces. The hole includes a first metal layer on the first component inside the hole. A second component includes a second component surfaced adjacent one of the first component surfaces. The second component includes a second metal layer on the second component. A fusible material is at least partially in the hole and at least partially contacting the second metal layer. The metal alloy establishes a connection between the first and second metal layers.

In an assembly having one or more features of the assembly of the preceding paragraph, the second component includes a recess in the second component surface, the second metal layer being at least partially in the recess.

In an assembly having one or more features of the assembly of either of the preceding paragraphs, the first metal layer is metalized onto the first component inside the hole and the second metal layer is metalized onto the second component inside the recess.

In an assembly having one or more features of the assembly of any of the preceding paragraphs, the first component comprises a first material that is different from the metal of the first metal layer and the second component comprises a second material that is different from the metal of the second metal layer.

In an assembly having one or more features of the assembly of any of the preceding paragraphs, the second component comprises a silicon wafer and the first component comprises one of borosilicate or silicon.

In an assembly having one or more features of the assembly of any of the preceding paragraphs, the fusible material comprises solder.

In an assembly having one or more features of the assembly of any of the preceding paragraphs, the connection between the first and second metal layers comprises a mechanical connection that secures the first component to the second component.

In an assembly having one or more features of the assembly of any of the preceding paragraphs, the fusible material comprises a metal alloy, the first component supports an electrically conductive member that is at least partially exposed on the one of the first component surfaces, the electrically conductive member is spaced from the hole, and the second metal layer is positioned on the second component such that the metal alloy contacts the first metal layer, the second metal layer and the conductive member.

In an assembly having one or more features of the assembly of any of the preceding paragraphs, the assembly comprises a second conductive member, the metal alloy contacts the second conductive member, and the metal alloy establishes an electrically conductive connection between the conductive member and the second conductive member.

In an assembly having one or more features of the assembly of any of the preceding paragraphs, the first component comprises a borosilicate wafer, the second component comprises a silicon wafer, the second component includes at least one channel configured to carry a fluid, the channel is open toward the one surface of the first component, and the conductive member comprises a heater element situated to selectively heat a fluid in the channel.

In an assembly having one or more features of the assembly of any of the preceding paragraphs, the first component comprises a silicon substrate turning mirror, the second component comprises an optical waveguide component, and the connection established by the fusible material provides a mechanical connection securing the silicon substrate turning mirror to the one surface of the optical waveguide component.

An illustrative method includes making a hole in a first component between two first component surfaces, establishing a first metal layer on the first component inside the hole, establishing a second metal layer on a second component, situating a surface of the second component adjacent one of the first component surfaces, placing a fusible material at least partially in the hole, melting at least some of the fusible material in the hole and establishing a connection between the first and second metal layers with the melted fusible material.

In a method having one or more features of the method of the preceding paragraph, the method includes making a recess in the second component and establishing the second metal layer inside the recess.

In a method having one or more features of the method of either of the preceding paragraphs, the method includes metalizing the first metal layer onto the first component inside the hole and metalizing the second metal layer onto the second component inside the recess.

In a method having one or more features of the method of any of the preceding paragraphs, the first component comprises a first material that is different from the metal of the first metal layer and the second component comprises a second material that is different from the metal of the second metal layer.

In a method having one or more features of the method of any of the preceding paragraphs, the fusible material comprises solder.

In a method having one or more features of the method of any of the preceding paragraphs, establishing the connection comprises establishing a mechanical connection that secures the first component to the second component.

In a method having one or more features of the method of any of the preceding paragraphs, the fusible material comprises a metal alloy. The method includes supporting an electrically conductive member on the first component where the conductive member is at least partially exposed on the one of the first component surfaces and making the hole in the first component in a position where the electrically conductive member is spaced from the hole. At least one of the recess and the second metal layer is situated relative to the hole where the melted metal alloy contacts the first metal layer, the second metal layer and the conductive member. An electrically conductive connection is established between the melted metal alloy and a second conductive member such that the metal alloy establishes an electrically conductive connection between the conductive member and the second conductive member.

In a method having one or more features of the method of any of the preceding paragraphs, the first component comprises a borosilicate wafer, the second component comprises a silicon wafer, the second component includes at least one channel configured to carry a fluid, the channel is open toward the one surface of the first component and the conductive member comprises a heater element situated to selectively heat a fluid in the channel.

In a method having one or more features of the method of any of the preceding paragraphs, the first component comprises a silicon substrate turning mirror and the second component comprises an optical waveguide component. The method comprises securing the silicon substrate turning mirror to the one surface of the optical waveguide component using the established connection.

The various features and advantages of disclosed example embodiments will become apparent to those skilled in the art from the following detailed description. The drawings that accompany the detailed description can be briefly described as follows.

BRIEF DESCRIPTION OF THE DRAWINGS

FIG. 7 schematically illustrates an example component.

FIG. 8 schematically illustrates a portion of a technique for securing the example component of FIG. 7 into a desired position within an assembly.

FIG. 8A is an illustration similar to that of FIG. 8 showing another example embodiment.

FIG. 9 illustrates an example feature of an assembly including the example component of FIG. 7.

DETAILED DESCRIPTION

Figure 1:
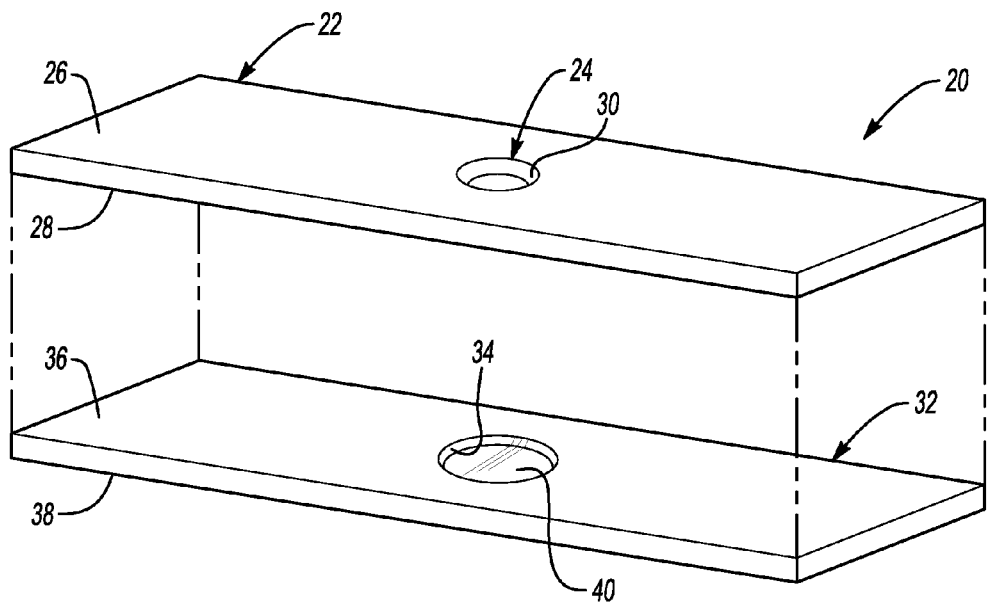
FIG. 1 schematically illustrates selected portions of an assembly designed according to an embodiment of this invention.

FIG. 1 schematically illustrates two components that are each part of an assembly 20. In this example the components comprises generally planar substrates and, for purposes of discussion, will be referred to as plates. A first plate 22 includes a hole 24 between two oppositely facing first plate surfaces 26 and 28. The hole 24 in this example extends all the way through the thickness of the first plate 22. The hole 24 includes a metal layer on a surface of the first plate 22 within the hole 24. In some examples, the entire inside surface of the hole 24 includes the metal layer 30.

A second plate 32 includes a recess 34 extending at least partially into a thickness of the second plate 32. The recess 34 in this example is open toward one surface 36 of the second plate 32. Another surface 38 faces in an opposite direction relative to the surface 36. The recess 34 includes a metal layer 40 on at least one surface of the second plate 32 within the recess 34. In the illustrated example, the metal layer 40 is situated on a bottom surface within the recess 34. Although not shown in the illustration, it is possible for the metal layer 40 to coat the entire inside of the recess 34.

Figure 2:
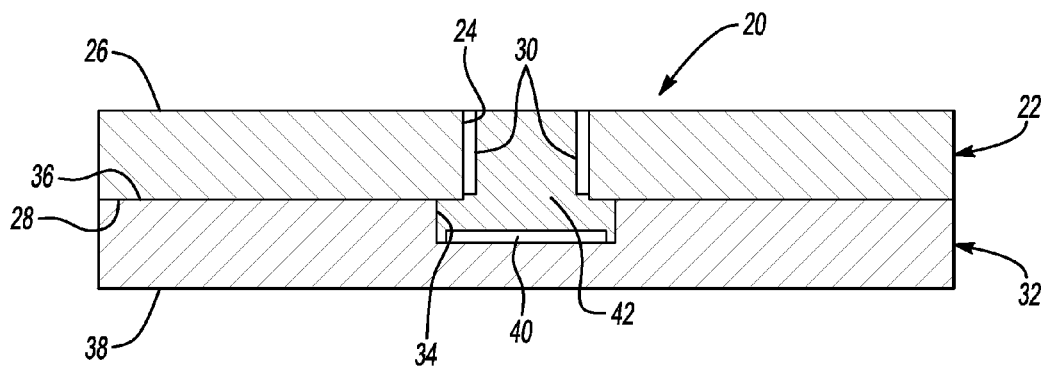
FIG. 2 is a cross-sectional illustration schematically illustrating selected features of an example assembly designed according to an embodiment of this invention.
Figure 3:
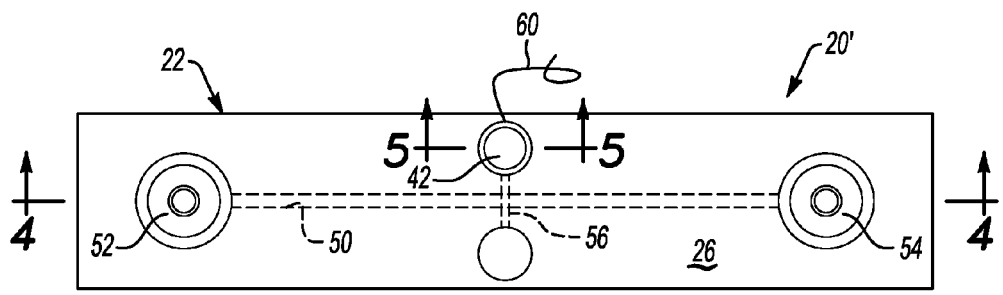
FIG. 3 illustrates an example arrangement of components of an assembly designed according to an embodiment of this invention.
Figure 4:
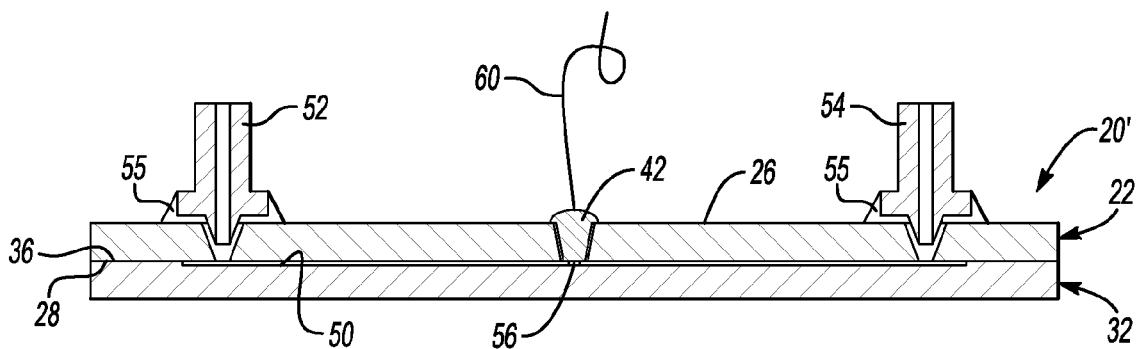
FIG. 4 is a cross-sectional illustration taken along the lines 4-4 in FIG. 3.

FIG. 2 illustrates, in cross-sectional view, selected portions of an assembly 20 with the first plate 22 and the second plate 32 secured together. When the plates 22 and 32 are situated next to each other so that the surface 28 on the first plate 22 is adjacent to (and in this example abutting against) the surface 36 of the second plate 32, the hole 24 and the recess 34 are at least partially aligned with each other. A fusible material 42 is at least partially within the hole 24 and at least partially within the recess 34. The fusible material 42 in some examples comprises a metal alloy, such as solder. For discussion purposes, the fusible material 42 will be referred to as a metal alloy. In this example, the metal alloy 42 is at least partially melted so that some of the metal alloy 42 is connected with the metal layer 30 inside the hole 24 and connected with the metal layer 40 inside the recess 34. The melted metal alloy 42 establishes a connection between the metal layers 30 and 40.

The connection established by the metal alloy 42 between the metal layers 30 and 40 may be useful for mechanically securing the plates 22 and 32 together. In other examples, the connection established by the metal alloy 42 establishes an electrically conductive connection for coupling electrically conductive components together.

The metal layers 30 and 40 in some examples are established using a metalizing technique. The thickness of the plates 22 and 32 may be on the order of one millimeter. The depth of the recess 34 may be on the order of a few microns up to about 0.5 millimeters. The thickness of the metal layers 30 and 40 may be on the order of 0.5 micrometers. Using a known metallization technique and a known metallization material allows for establishing a metal layer 30 or 40 of a desired thickness inside the hole 24 or a recess 34, respectively. The material of the metal layers is compatible with the metal alloy 42 to establish the desired connection.

Referring to FIGS. 3-6, an example assembly 20' includes a micro-fluid channel 50 situated between the plates 22 and 32. In the illustrated example, the second plate 32 comprises a silicon wafer and the first plate 22 comprises a glass or borosilicate wafer. An anodic bond is used for securing the plates 22 and 32 together in some examples. The microfluidic channel 50 is established by an etched groove in the surface 36 of the silicon wafer 32. A fluid inlet coupling 52 and a fluid outlet coupling 54 are situated on the surface 26 of the first plate 22. In this example, a solder joint 55 is used for securing the inlet coupling 52 and outlet coupling 54 in place.

Figure 6:
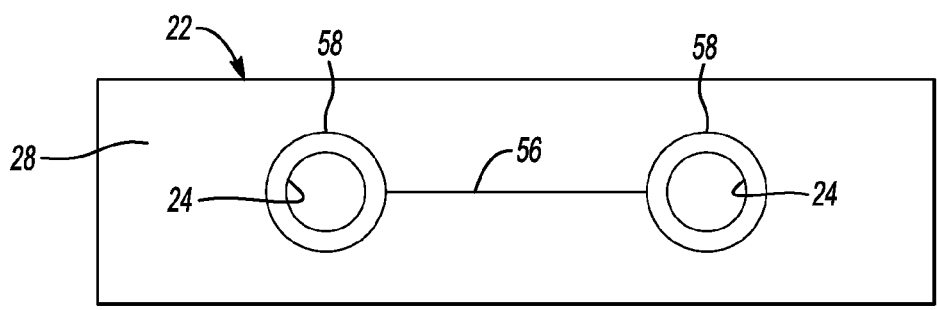
FIG. 6 schematically illustrates selected features of the embodiment shown in FIG. 3.

A heater element 56 is provided for heating at least some fluid within the channel 50. The heater element 56 is situated on the bottom (according to the drawings) surface 28 of the first plate 22. As shown in FIG. 6, electrically conductive members 58 comprise rings near opposite ends of the heater element 56. The holes 24 are situated in a position inside of the conductive member rings 58.

Figure 5:
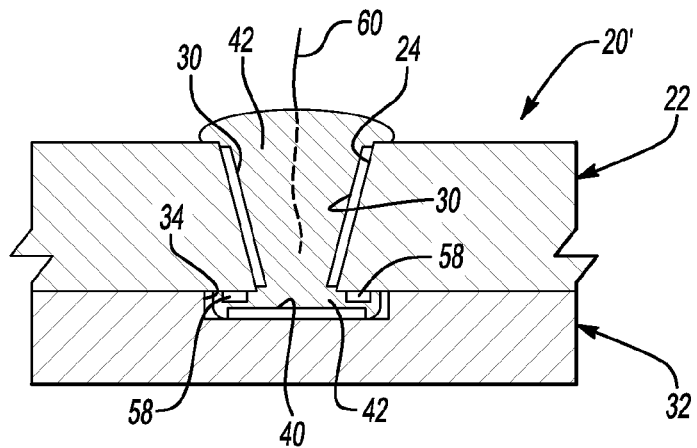
FIG. 5 is a cross-sectional illustration taken along the lines of 5-5 in FIG. 3.

One challenge associated with making an electrical connection between the conductive members 58 and another conductor 60 for purposes of establishing an electrically conductive connection to operate the heater element 56 is that the conductive member rings 58 are not exposed when the first plate 22 and second plate 32 have been secured together. Utilizing a hole 24 and recess 34 and metal layers 30 and 40 as described above facilitates making an electrically conductive connection between the conductive member or lead 60 and the conductive member rings 58. FIG. 5 illustrates how the metal alloy 42, such as solder, may be positioned at least partially within the hole 24 and the recess 34 so that the metal alloy contacts the metal layer 30 and the metal layer 40. The metal layer 40 is situated within the recess 34 in a manner that facilitates at least some melted metal alloy 42 from inside the hole 28 flowing into or entering the recess 34 in a position sufficient to make contact with the conductive member ring 58. The lead 60 is also electrically coupled with the melted metal alloy 42 as schematically shown in FIG. 5. Therefore, the assembly 20' shown in FIG. 5 establishes an electrically conductive connection between the lead or conductive member 60 and the conductive member ring 58 through the metal alloy 42, which is also connected with the metal layers 30 and 40.

Another example assembly 20" can be appreciated by considering FIGS. 7-9. FIG. 7 schematically illustrates a silicon substrate turning mirror 70 that includes a silicon substrate layer 72 with a metalized mirror surface 74 formed in a known manner. For example, a metallization including gold may be metalized onto a surface of the silicon substrate 72 to form a mirrored surface shown at 74. The same metallization process may be used to establish a metal layer inside of holes 76 provided on the silicon substrate 72. In the illustrated example, at least surfaces 78 inside the holes 76 include a metal layer that comprises the same metallization material used for establishing the mirrored surface of the mirror 74.

Given that the silicon wafer 74 used for the turning mirror 74 is very thin and is typically incorporated into a very small component, such as a light wave guide, it may be challenging to accurately position the silicon substrate turning mirror 70 in a desired position within the assembly.

FIG. 9 shows the assembly 20" including the silicon wafer 72 having a surface 28 secured against a surface 36 of a silicon insulated wafer. FIG. 8 schematically shows the assembly 20" during the process of securing the silicon wafer 72 in place. The silicon substrate turning mirror 70 is positioned on the surface 36 of the silicon insulated wafer second plate 32 in a desired position. A solder ball 42 is situated at least partially within each of the holes 76. When the solder balls 42 at least partially melt, some of the solder material flows into the corresponding recess 34 and establishes a connection between the metal layers 78 inside the holes 76 and the metal layers 40 inside the recesses 34, which are at least partially in alignment with the holes 76 when the silicon substrate turning mirror 70 is in the desired position on the second plate 32. Although solder balls 42 are illustrated in FIG. 8, it is also possible to use solder paste as an alternative fusible material, for example.

While each of the embodiments described above includes a recess 34 with the metal layer 40 in the recess, some embodiments do not include a recess. FIG. 8A shows one such example in which the metal layer 40 is situated on the surface 36 without a recess at the location of the metal layer 40. The metal layer 40 is situated on the surface 36 in a location that aligns with the opening 76 when the surface 28 is situated in a desired position against the surface 36. Such an arrangement is useful, for example, when the connection established by the metal alloy 42 and the metal layers 40 and 78 (or 30) is intended to be a mechanical connection.

Once the mirror has been secured in place because of the mechanical connection between the metal alloy 42, the metal layers 78 and the metal layers 40, the turning mirror surface 74 may be used as desired within a wave guide device. As shown in FIG. 9, an optical wave guide channel 80 directs light as schematically shown at 82 toward the mirrored surface 74. The light is then reflected off the mirrored surface 74 as schematically shown at 84 to achieve a desired operation of the wave guide device for associated components. In this example, the connection between the metal layers 78 and 40 and the metal alloy 42 establishes a mechanical connection for securing the silicon substrate turning mirror component 70 in a desired position place within the optical wave guide device assembly 20".

The connections shown in the illustrated examples provide robust and reliable electrically conductive connections between components that otherwise would be difficult to establish. Further, the connections in the illustrated examples provide a robust and reliable mechanical connection that is useful for securing components together in a manner that may provide more accurate placement of those components relative to each other. Moreover, the connections shown in the illustrated example are achievable in an economic and efficient manner.

While two components are shown secured together in the drawings, other embodiments include more than two components. For example, a hole may be provided through each of first and second components with a metal layer on at least some of the surfaces within those holes. A third component includes another metal layer (e.g., within a recess or on a surface of the third component). The fusible material or metal alloy establishes a connection between the fusible material, the metal layer in the hole of the first component, the metal layer in the hole of the second component and the metal layer on the third component.

While various features and aspects are described above in connection with one or more particular embodiments, those features and aspects are not necessarily exclusive to the corresponding embodiment. The disclosed features and aspects may be combined in other ways than those specifically mentioned above. In other words, any feature of one embodiment may be included with or substituted for a feature of another embodiment.

The preceding description is illustrative rather than limiting in nature. Variations and modifications to the disclosed examples may become apparent to those skilled in the art that do not necessarily depart from the essence of the contribution to the art provided by the disclosed examples. The scope of legal protection provided to the invention can only be determined by studying the following claims.

I claim:

1. An assembly, comprising:
   a first component including a hole between two first component surfaces, the hole including a first metal layer on a third surface of the first component inside the hole, the third surface at least partially defining the hole;
   a second component including a second component surface adjacent one of the first component surfaces, the second component including a second metal layer on the second component; and
   a fusible material placed at least partially in the hole and at least partially contacting the first and second metal layers, the fusible material establishing a connection between the first and second metal layers.

2. The assembly of claim 1, wherein the second component includes a recess in the second component surface, the second metal layer being at least partially in the recess.

3. The assembly of claim 2, wherein
   the first metal layer is metalized onto the first component inside the hole; and
   the second metal layer is metalized onto the second component inside the recess.

4. The assembly of claim 1, wherein
   the first component comprises a first material that is different from the metal of the first metal layer; and the second component comprises a second material that is different from the metal of the second metal layer.

5. The assembly of claim 4, wherein
the second component comprises a silicon wafer; and
the first component comprises one of borosilicate or silicon.

6. The assembly of claim 1, wherein the fusible material comprises solder.

7. The assembly of claim 1, wherein the connection between the first and second metal layers comprises a mechanical connection that secures the first component to the second component.

8. The assembly of claim 1, wherein
the fusible material comprises a metal alloy;
the first component supports an electrically conductive member that is at least partially exposed on the one of the first component surfaces;
the electrically conductive member is spaced from the hole; and
the second metal layer is positioned on the second component such that the metal alloy contacts the first metal layer, the second metal layer and the conductive member.

9. The assembly of claim 8, comprising a second conductive member and wherein
the metal alloy contacts the second conductive member; and
the metal alloy establishes an electrically conductive connection between the conductive member and the second conductive member.

10. The assembly of claim 9, wherein
the first component comprises a borosilicate wafer;
the second component comprises a silicon wafer;
the second component includes at least one channel configured to carry a fluid;
the channel is open toward the one surface of the first component; and
the conductive member comprises a heater element situated to selectively heat a fluid in the channel.

11. The assembly of claim 1, wherein
the first component comprises a silicon substrate turning minor;
the second component comprises an optical waveguide component; and
the connection established by the fusible material provides a mechanical connection securing the silicon substrate turning minor to the one surface of the optical waveguide component.

12. A method, comprising:
making a hole in a first component between two first component surfaces;
establishing a first metal layer on a third surface of the first component inside the hole, the third surface at least partially defining the hole;
establishing a second metal layer on a second component;
situating a surface of the second component adjacent one of the first component surfaces;
placing a fusible material at least partially in the hole;
melting at least some of the fusible material in the hole, such that the fusible material at least partially contacts the first and second metal layers; and
establishing a connection between the first and second metal layers with the melted fusible material.

13. The method of claim 12, comprising
making a recess in the second component; and
establishing the second metal layer inside the recess.

14. The method of claim 13, comprising
metalizing the first metal layer onto the first component inside the hole; and
metalizing the second metal layer onto the second component inside the recess.

15. The method of claim 12, wherein
the first component comprises a first material that is different from the metal of the first metal layer; and
the second component comprises a second material that is different from the metal of the second metal layer.

16. The method of claim 12, wherein the fusible material comprises solder.

17. The method of claim 12, wherein establishing the connection comprises establishing a mechanical connection that secures the first component to the second component.

18. The method of claim 12, wherein
the fusible material comprises a metal alloy;
the method comprising:
    supporting an electrically conductive member on the first component where the conductive member is at least partially exposed on the one of the first component surfaces;
    making the hole in the first component in a position where the electrically conductive member is spaced from the hole;
    situating at least one of the recess and the second metal layer relative to the hole where the melted metal alloy contacts the first metal layer, the second metal layer and the conductive member; and
    establishing an electrically conductive connection between the melted metal alloy and a second conductive member such that the metal alloy establishes an electrically conductive connection between the conductive member and the second conductive member.

19. The method of claim 18, wherein
the first component comprises a borosilicate wafer;
the second component comprises a silicon wafer;
the second component includes at least one channel configured to carry a fluid;
the channel is open toward the one surface of the first component; and
the conductive member comprises a heater element situated to selectively heat a fluid in the channel.

20. The method of claim 12, wherein
the first component comprises a silicon substrate turning minor;
the second component comprises an optical waveguide component; and
the method comprises:
    securing the silicon substrate turning minor to the one surface of the optical waveguide component using the established connection.

21. The method of claim 12, wherein the first component is a generally planar substrate, and the second component is a generally planar substrate.

22. An assembly, comprising:
a first component including a hole between two first component surfaces, the hole including a first metal layer on the first component inside the hole;
a second component including a second component surface adjacent one of the first component surfaces, the second component including a second metal layer on the second component;
a fusible material at least partially in the hole and at least partially contacting the second metal layer, the fusible material establishing a connection between the first and second metal layers, the fusible material comprising a metal alloy;

an electrically conductive member; and a second conductive member;

wherein:

the first component comprises a borosilicate wafer, and supports the electrically conductive member, which is at least partially exposed on the one of the first component surfaces;

the electrically conductive member is spaced from the hole;

the second metal layer is positioned on the second component such that the metal alloy contacts the first metal layer, the second metal layer and the conductive member;

the metal alloy contacts the second conductive member;

the metal alloy establishes an electrically conductive connection between the conductive member and the second conductive member;

the second component comprises a silicon wafer and includes at least one channel configured to carry a fluid;

the channel is open toward the one surface of the first component; and the conductive member comprises a heater element situated to selectively heat a fluid in the channel.

23. An assembly, comprising:

a first component including a hole between two first component surfaces, the hole including a first metal layer the first component inside the hole;

a second component including a second component surface adjacent one of the first component surfaces, the second component including a second metal layer on the second component; and a fusible material at least partially in the hole and at least partially contacting the second metal layer, the fusible material establishing a connection between the first and second metal layers;

wherein the first component comprises a silicon substrate turning minor;

wherein the second component comprises an optical waveguide component; and wherein the connection established by the fusible material provides a mechanical connection securing the silicon substrate turning mirror to the one surface of the optical waveguide component.

24. The assembly of claim 1, wherein the first component is a generally planar substrate, and the second component is a generally planar substrate.

* * * * *